UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

COMPOUND OF PYROXYLIN.

SPECIFICATION forming part of Letters Patent No. 551,456, dated December 17, 1895.

Application filed June 22, 1895. Serial No. 553,691. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which the following is a specification.

In my United States Patent No. 517,987, dated April 10, 1894, I have described the state of the art to which the present invention is related and have explained the difficulties connected with the discovery and application of solvents of pyroxyline, also the action of solvents in the various manipulations to which pyroxyline compounds are subjected. That patent is especially devoted to the application of acetanilid (phenylacetamide) as a solid solvent of pyroxyline, and in order to avoid unnecessary repetition I refer to it as fully setting forth such matter and details as are not described in the present application.

The present invention is an improvement on the invention described in said Patent No. 517,987, and its object is to still further extend the list of substances which can be employed as solvents of pyroxyline.

While acetanilid is a useful solid solvent, either alone or in combination with other solvent substances, there is a group of substances closely related to it which I have ascertained by experiment can be substituted for the acetanilid, or used in connection with it, and with other solid solvents—like camphor, for instance—with the result of producing compounds of pyroxyline possessing new properties. This group comprises the following substances: Methylacetanilid, ethylacetanilid, propylacetanilid, butylacetanilid and amylacetanilid. These substances are both liquid and solid in their nature; but they are all solvents of pyroxyline, and can be usefully employed in this art, as hereinafter more fully explained.

The present invention is based on the discovery of their solvent powers, and the novel combinations which my experiments have disclosed are rendered possible by their employment.

In forming the alcoholic acetanilids, the preferable method is to act on sodium acetanilide with a haloid alcoholic derivative. Thus, to form methylacetanilid, sodium acetanilid $[C_2H_3O.N(C_6H_5)Na]$ is acted upon with methyl iodide ($CH_3I$), the reaction being expressed by the equation

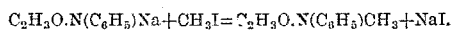

$$C_2H_3O.N(C_6H_5)Na + CH_3I = C_2H_3O.N(C_6H_5)CH_3 + NaI.$$

In a similar manner, by substituting the haloid derivatives of the other homologous aliphatic alcohols for methyl iodide the alcoholic acetanilids corresponding to such alcohols are easily produced. For instance, propylacetanilid is formed by acting on sodium acetanilid with propylic iodide, propylic chloride or propylic bromide.

The reactions just described are the simplest methods for producing alcoholic acetanilids, but still other processes are known. For instance, they are made by acting on substituted anilines with the aliphatic acid anhydrides. By "substituted anilines" I mean a compound which is formed by the substitution of an alcoholic radicle for one atom of hydrogen in the amide group of anilines. Representing aniline by the rational formula $C_6H_5.NH_2$, propyl aniline is shown by the formula $C_6H_5.NH(C_3H_7)$.

Methylacetanilid, sometimes known as "exalgine," is a hard crystalline substance possessing neither color nor appreciable odor, and it can be used in making pyroxyline combinations in the same manner as camphor. It is free from the difficulties connected with the use of acetanilid, especially when it is desirable to employ alcohol as the only liquid menstruum, while, at the same time, it forms compounds which are as odorless and permanent as those in which the acetanilid is employed. In other words, it combines the good features of both camphor and acetanilid, and gives a compound which is more readily plastic than that made with either camphor or acetanilid. I have discovered, also, that in combination with either camphor or acetanilid, it forms a pyroxyline compound superior to the camphor-acetanilid mixture of my Patent No. 517,987.

The camphor-methylacetanilid compositions can be manipulated at temperatures below the boiling-point of water, and are capable of forming beautiful colorless compounds. The methylacetanilid-phenylacetamide combinations are also easily plastic, and are colorless and practically non-shrinkable when thoroughly dried.

In using methylacetanilid alone, or in combination with camphor or acetanilid, as the solid solvent, the operator can employ either alcohol, wood-alcohol or acetone; but, as before stated, the use of grain-alcohol is practicable with this solvent, and the experience with camphor is sufficient to enable the operator to make the necessary combinations.

The discovery and utilization of the harmonious action of acetanilid and alcohol in the presence of methylacetanilid constitute an important improvement over my acetanilid Patent No. 517,987.

As to proportions, I have found that one part methylacetanilid (or its combination in equal weights with either camphor, or acetanilid, or a mixture of both) is efficient when employed with two parts of pyroxyline. The liquid solvents or menstrua can be employed in the usual proportions. Either the rolling method or the liquid method of conversion is applicable in making the methylacetanilid compounds.

Ethylacetanilid is also an odorless substance resembling ordinary acetanilid. With it I have formed pyroxyline combinations which are superior in plasticity to those made with acetanilid. Its employment with either camphor or acetanilid also results in compounds which possess new properties. The camphor combinations, especially, mold at hot-water temperature. The phenylacetamide-ethylacetanilid combinations are also easily plastic.

With the camphor-ethylacetanilid compounds I find I can employ grain-alcohol as the liquid menstruum; but when the ethylacetanilid is used alone, or in combination with acetanilid, I prefer to use acetone or wood-alcohol as the liquid. I have found that proportions substantially the same as those given for methylacetanilid are efficient. The ethylacetanilid or the ethylacetanilid-phenylacetamide compounds, when dry, are practically non-shrinkable and odorless.

*Propylacetanilid.*—This substance resembles ordinary acetanilid in appearance. It is practically inodorous. I find that its combinations with camphor resemble those made with ethylacetanilid. Combinations of the methylacetanilid, ethylacetanilid and propylacetanilid can be made in pyroxyline compounds, with the effect of producing excellent plastic properties. The mixtures of any two or three of these substances are practically superior as solvents to each substance used separately.

*Butylacetanilid.*—This substance is useful as a liquid solvent of very low volatility. It is a slow solvent in the cold, but is rendered very active when mixed in equal proportions with ordinary grain-alcohol. It mixes in all proportions with either grain-alcohol or wood-alcohol, and I recommend these liquid menstrua to be employed with it in making suitable pyroxyline combinations. It is useful, also, as a liquid menstruum in combination with camphor, forming therewith a good solvent of pyroxyline in the cold. It does not easily dissolve ordinary acetanilid. I would not recommend its employment in colorless or rapid-drying compounds of pyroxyline. It is useful where a slow-drying or practically non-volatile liquid is required. I have found that the best action is obtained by diluting it with other active solvents, like acetone and the two alcohols mentioned. Butylacetanilid can be employed in connection with the three solid alcoholic acetanilids hereinbefore referred to. It reduces the plastic point of the compounds, and imparts a rather agreeable odor.

Amylacetanilid is a liquid which, while it slowly dissolves pyroxyline in the cold, exhibits its best solvent power in combination with alcohol and other liquid menstrua. I have found it useful in connection with camphor, which it dissolves very readily. It is especially harmonious with benzole, with which in equal parts it is still a moderately-active solvent. I have found, however, that it is best used in combination with the solid alcoholic acetanilids of the present application or with camphor, and also the usual liquid menstrua employed in this art. I recommend it especially where an extremely slow-drying liquid solvent is required. Amylacetanilid and butylacetanilid are unique in this respect, as they supply the art with liquid solvents of such slow volatility that they answer for some mixtures (like, for instance, liquid solutions for printing-inks) which are extremely difficult to obtain with other solvents; but notwithstanding the usefulness of all of the members of the present group of solvents, I especially direct the attention of the operator to methylacetanilid. I have been so successful in using it that I am inclined to consider it superior to camphor or acetanilid or any of the known solid solvents. In addition to the described reactions with alcohol, acetone, and wood-alcohol, it is specially harmonious in connection with fusel-oil, and possesses the remarkable property of forming solvent solutions with acetanilid in a fusel-oil menstruum.

Some of the substances in the present group of solvents exist in various modifications—for instance, butylacetanilid and iso-butylacetanilid. I have demonstrated, however, that the present group of solvents includes all of the alcoholic derivatives between the extremes of methylacetanilid (methylphenylacetamide) and amylacetanilid (amylphenylacetamide.) Again, in making these alcoholic acetanilids for manufacturing purposes I do not consider it necessary that they be composed of simple substances, for it can readily be understood from the description of their action in the present application that combinations of the various substances are useful, provided, of course, that where a solid solvent is desired the mixture of alcoholic acetanilids is free from the liquid products, although it is not necessary that the liquid alcoholic acetanilids be entirely freed from such solid products as they might hold in solution when a liquid solution is desired.

With these instructions, the operator will find no difficulty in practically applying the present invention. The substances mentioned, although not in every case procurable in commerce, are nevertheless known to chemists and capable of being manufactured. Experience has shown that an increased demand for such substances generally leads to a cheapening of the methods which produce them, and I need only refer to acetate of amyl, the demand for which as a solvent of pyroxyline, after my discovery of its usefulness in the manufacturing class of compounds, led to its production at a much lower cost. As these solid substances of the present group exhibit their solvent power when heated, it is evident that any application of heat, or heat and pressure, to the dried or seasoned pyroxyline products which will render them plastic is a use of the solvent power of the solid solvent present in the compound. It is also obvious that both the liquid solvents and the solid solvents of the present application exert their solvent power, or modify the action or properties of the compounds made with them, even when they are associated with other solvents, and are not necessarily employed for the active solvent effect of the original mixture.

Solvents may be used to advantage, even if they are introduced when the original fibrous structure of the pyroxyline has been broken down by the use of other ingredients, and their presence gives properties to the compounds which they would not otherwise possess, and when I refer to the solvent or converting action of my new group of substances in this specification it is with this understanding.

I do not confine myself to any particular proportion, as the proportions I have given can be varied to meet the necessities of any particular case. Nor do I confine this invention to any particular method of combining the ingredients, or producing therewith the desired compound. The methyl acetanilid and the solid solvent combinations recommended for easy plasticity will be found useful in the solid process of conversion where there is no liquid solvent present in the compound. It is evident that whether the solvent is combined with the pyroxyline by being ground therewith, or mixed in solution, or in any other way, the close combination which results therefrom is an intimate mixture of the pyroxyline and solvent.

I claim herein any use of the specified new group of alcoholic acetanilids as solvents or converting agents in the manufacture of pyroxyline compounds and the new compositions of matter which form the basis of the present invention.

Having thus described the nature and object of my invention, what I claim, and desire to secure by Letters Patent, is—

1. In the art of manufacturing compounds of pyroxyline, the subjecting of such pyroxyline to the solvent or converting action of one or more of the hereinbefore specified group of alcoholic acetanilids, (viz.—methyl acetanilid, ethyl acetanilid, propyl acetanilid, butyl acetanilid, and amyl acetanilid) substantially as set forth.

2. A new composition of matter consisting of pyroxyline and one or more of the hereinbefore specified group of alcoholic acetanilids, (viz.—methyl acetanilid, ethyl acetanilid, propyl acetanilid, butyl acetanilid, and amyl acetanilid) substantially as set forth.

3. The process of manufacturing pyroxyline compounds which consists in intimately mixing pyroxyline and one or more of the hereinbefore specified group of alcoholic acetanilids, (viz.—methyl acetanilid, ethyl acetanilid, propyl acetanilid, butyl acetanilid, and amyl acetanilid) and subjecting such mixture to heat and pressure, substantially as set forth.

4. The process of manufacturing pyroxyline compounds which consists in mixing pyroxyline, one or more of the hereinbefore specified group of alcoholic acetanilids, (viz.— methyl acetanilid, ethyl acetanilid, propyl acetanilid, butyl acetanilid, and amyl acetanilid) and a liquid menstruum or liquid menstrua, and subsequently subjecting the resulting compound to heat and pressure sufficient to render the compound plastic, substantially as set forth.

5. The process of manufacturing compounds of pyroxline which consists in mixing pyroxyline, one or more of the hereinbefore specified group of alcoholic acetanilids, (viz.— methyl acetanilid, ethyl acetanilid, propyl acetanilid, butyl acetanilid, and amyl acetanilid) and a liquid menstruum or liquid menstrua sufficient in amount to convert the mixture into a pyroxyline solution or compound, substantially as described.

6. The new composition of matter consisting of pyroxyline, one or more of the hereinbefore specified group of alcoholic acetanilids, (viz.—methyl acetanilid, ethyl acetanilid, propyl acetanilid, butyl acetanilid, and amyl acetanilid) and a liquid menstruum or liquid menstrua, substantially as described.

7. The process of manufacturing compounds of pyroxyline which consists in intimately mixing pyroxyline, one or more of the hereinbefore specified group of alcoholic acetanilids, (viz.—methyl acetanilid, ethyl acetanilid, propyl acetanilid, butyl acetanilid, and amyl acetanilid) and one or more of the known solvents of pyroxyline, and subsequently subjecting the resulting compound to heat and pressure sufficient to render the compound plastic, substantially as described.

8. The process of manufacturing compounds of pyroxyline which consists in mixing pyroxyline with one or more of the hereinbefore specified group of alcoholic acetanilids, (viz.—methyl acetanilid, ethyl acetanilid, propyl acetanilid, butyl acetanilid, and amyl acetanilid) one or more of the hereinbefore specified known solid solvents of pyroxyline, and a liquid menstruum or liquid menstrua sufficient in amount to dissolve or convert the mixture into a pyroxyline solution or compound, substantially as described.

9. A new composition of matter consisting of pyroxyline, one or more of the hereinbefore specified group of alcoholic acetanilids, (viz.—methyl acetanilid, ethyl acetanilid, propyl acetanilid, butyl acetanilid, and amyl acetanilid) and one or more of the hereinbefore specified known solvents of pyroxyline, substantially as described.

In witness whereof I have hereunto signed my name this 14th day of June, 1895.

JOHN H. STEVENS.

In presence of—
ABRAHAM MANNERS,
CHAS. W. CONNER.